United States Patent
Ruutu et al.

(10) Patent No.: US 7,039,013 B2
(45) Date of Patent: May 2, 2006

(54) PACKET FLOW CONTROL METHOD AND DEVICE

(75) Inventors: Jussi Ruutu, Espoo (FI); Dongmei Zhang, Beijing (CN); Yu Shi, Beijing (CN); Renaud Cuny, Helsinki (FI); Jlan Ma, Beijing (CN); Khiem Le, Coppell, TX (US); Ghassan Naim, Irving, TX (US)

(73) Assignee: Nokia Corporation, Espoo (FI)

( * ) Notice: Subject to any disclaimer, the term of this patent is extended or adjusted under 35 U.S.C. 154(b) by 900 days.

(21) Appl. No.: 10/029,976

(22) Filed: Dec. 31, 2001

(65) Prior Publication Data

US 2003/0123392 A1 Jul. 3, 2003

(51) Int. Cl.
*H04L 1/00* (2006.01)
(52) U.S. Cl. .................................. 370/235; 370/429
(58) Field of Classification Search ........ 370/412–429, 370/229–235
See application file for complete search history.

(56) References Cited

U.S. PATENT DOCUMENTS

| 5,751,712 | A | 5/1998 | Farwell et al. |
| 6,034,945 | A | 3/2000 | Hughes et al. |
| 6,314,103 | B1 | 11/2001 | Medhat et al. |
| 6,317,427 | B1 * | 11/2001 | Augusta et al. ............. 370/357 |
| 6,473,815 | B1 * | 10/2002 | Lu et al. ...................... 710/52 |
| 6,741,570 | B1 * | 5/2004 | Kojima ....................... 370/253 |
| 6,822,966 | B1 * | 11/2004 | Putcha et al. ............... 370/411 |

FOREIGN PATENT DOCUMENTS

| WO | 0052955 | 9/2000 |
| WO | 0163856 | 8/2001 |

* cited by examiner

*Primary Examiner*—Dang Ton
*Assistant Examiner*—Phuc Tran
(74) *Attorney, Agent, or Firm*—Squire, Sanders & Dempsey L.L.P.

(57) ABSTRACT

The present invention relates to a method and network node for controlling packet flow in a buffer means (13; 14) of a network node of a data network, wherein a nominal capacity is assigned to each data flow, and an additional or free capacity is shifted from a first flow portion to a second flow portion when a new data packet of said second flow portion has been received and said nominal capacity has been exceeded. The nominal capacity may be an upper buffer memory limit used for controlling queuing of data packets in a buffer memory (13) of said buffer means, wherein the memory space of the buffer memory (13) is shared between a plurality of channels allocated to respective packet data connections. Then, the free capacity corresponds to a memory space shifted from a first channel to a second channel, when a new data packet of the second channel has been received and not enough memory space is available for the second channel. Thus, a dynamic buffer-sharing mechanism is provided which reduces the number of packet drops in the buffer memory (13) during congestion and improves network throughput. Alternatively, the nominal capacity may be a nominal flow rate at which data flow traffic is guaranteed in a QoS scheduling algorithm. Then, a residual rate corresponding to the difference between the nominal flow rate and an instantaneous traffic is shifted between flow portions of a buffer means controlled by the scheduling algorithm to maximize total system throughput.

34 Claims, 5 Drawing Sheets

PACKET FLOW CONTROL METHOD AND DEVICE

FIELD OF THE INVENTION

The present invention relates to a method and network node for controlling packet flow in a buffer means of a network node of a data network, such as a 3G (3rd generation) mobile network, in particular using a Packet Data Convergence Protocol (PDCP) buffer in a PDCP layer or using a QoS scheduling algorithm in a Media Access Control (MAC) layer of.

BACKGROUND OF THE INVENTION

Network layer protocols are intended to be capable of operating over services derived from a wide variety of sub-networks and data links. UMTS (Universal Mobile Telecommunications System) supports several network layer protocols providing protocol transparency for the users of the service. Introduction of new network layer protocols to be transferred over the UMTS Terrestrial Radio Access Network (UTRAN) shall be possible without any changes to UTRAN protocols. Therefore, all functions related to transfer of packets from higher layers (PDCP Service Data Units (SDUs)) shall be carried out in a transparent way by the UTRAN network entities. This is one of the requirements for PDCP.

According to the ETSI specification TS 125 323, the PDCP is responsible for header compression and decompression of IP (Internet Protocol) data streams (e.g. TCP/IP and RTP/UDP/IP headers) at the transmitting and receiving entity, respectively, transfer of user data, buffering of transmitted PDCP SDUs and associating PDCP SDU sequence numbers to the transmitted and received PDCP SDUs to guarantee lossless SRNS (Serving Radio Network Subsystem) relocation, and multiplexing of different radio bearers onto the same RLC (Radio Link Control) entity.

The PDCP SDUs which require reliable data transfer, are buffered and numbered in the PDCP layer. Numbering is carried out after header compression. The reception of a PDCP release request triggers the deletion of the buffer for the related PDCP entity. If lossless SRNS relocation is required, the PDCP entity buffers a PDCP SDU until information of successful transmission of the PDCP PDU (Packet Data Unit) has been received from the RLC. For each radio bearer, an Uplink (UL) Send PDCP Sequence Number is associated with each sent PDCP PDU in the user equipment (UE) or mobile terminal and a Downlink (DL) Send PDCP Sequence Number is associated with each sent PDCP PDU in the SRNC (Serving Radio Network Controller). Additionally, for each radio bearer, an UL Receive PDCP Sequence Number is associated with each received PDCP PDU in the SRNC and a DL Receive PDCP Sequence Number is associated with each received PDCP PDU in the UE or mobile terminal. When the PDCP entity is set up for the first time for the PDCP user, the PDCP sequence numbers are initialized to zero. The corresponding values are incremented by one at each transmission and reception of a PDCP PDU. The value of the PDCP sequence number ranges from 0 to 255. For unacknowledged mode RLC data transfer, the PDCP entity deletes a PDCP SDU immediately after the corresponding PDCP PDU has been delivered to the RLC.

In a Radio Network Controller (RNC) of the UTRAN, a buffer memory is provided in the PDCP layer, which is responsible for the buffering of the data packets (PDUs) transferred between mobile terminals and Internet hosts. For each mobile terminal that is accessing the Internet, a channel is assigned which includes a PDCP buffer inside. In the current implementation of the RNC, a maximum number of 80 concurrent channels is provided. The total memory used for the PDCP buffer is limited to 2M bytes and is divided into 80 parts, wherein each part is used for a corresponding channel. Thus, each channel can only use its own part of the buffer memory for its buffering. Due to different traffic in the different channels, buffer overflows may occur in some channels, while other parts of the memory are not used in some other channels. However, this underutilization of the buffer memory may lead to an increased number of packet-drops in case of traffic congestion and thus to an end-to-end network performance degradation.

Furthermore, with many concurrent data flows supported in all-IP networks (basic voice, real time video, email, ftp, www . . . ), a QoS (Quality of service) scheduling algorithm is required to maintain the QoS requirements for each flow over the shared cellular communication link. Additionally, the QoS scheduling algorithm should provide fair and optimum chances for multiple users and their independent traffic flows to share the limited set of channels available in a given radio cell in the uplink and the downlink.

For real time Variable Bit Rate (VBR) traffic (e.g. real-time conversational video), one of the problems to solve is to provide enough bandwidth to match the instantaneous rate demands, in order to meet the delay requirements of real-time traffic. A straight forward solution is to assign a dedicated bandwidth to each flow, but if the flows have fluctuating instantaneous rates, such a solution leads to bandwidth waste (if the dedicated bandwidth is set to the peak rate demand) or lack of QoS guarantees (if the dedicated bandwidth is set lower). A well-known solution is to use statistical multiplexing over multiple flows, but statistical multiplexing works well only over a large number of flows. Over a cellular link, due to bandwidth and terminal limitations, it is not valid to assume a large number of flows.

The problem is considered an open problem. However, some documented ideas have been proposed but only provide a partial solution to the problem. Deficit Round Robin (DRR), Weighted Fair Queuing (WFQ) and Earliest Due Date (EDD) are some of the documented scheduling algorithms that provide some form of service rates provisioning to concurrent user flows in different methods.

In DRR, a fairness level is achieved by using a deficit counter and a quantum of service for each user flow to decide how long the flow should be constantly served before moving on to the next user data flow. The service amount for a flow, in number of packets, may vary between rounds. During one round, user flows are selected sequentially. During each round in the Deficit Round Robin model, each user flow is serviced up to its allocated service rate (in number of packets) before moving to the next user flow. Even though the rate per user flow may be guaranteed, a packet may be delayed by a full round duration. For real time services support, lower bound delays are required, and given that the maximum delay is governed by the round duration, it would be impossible to provide different delay bounds to different flows as the number of user flows increases, therefore leading to a high packet drop ratio (packets exceeding their delay constraint are considered useless).

In WFQ, fairness is achieved by allocating a fixed service rate to each flow during initialisation stage. The allocated service rate is proportional to the weight of the carried traffic, for e.g. higher weights are assigned for lower delay constraint flows. In the WFQ model, the number of bits served in a scheduling round is proportional to the rate allocated to the flow (allocated rate is based on a fixed pre-assigned weight of the flow). To reduce the delay for a flow, its allocated rate must be increased. Given that the rate is fixed, the coupling between the rate allocation and the delay may lead to inefficient resource utilization (a low rate assignment reduce the QoS of the flow while a very large rate leads to a waste of bandwidth. This is due to the rate fluctuations in a real-time VBR traffic e.g. video conferencing and video streaming).

In EDD, each flow is served using a deadline base strategy where the user flow with earliest deadline is selected first. No explicit service rate is allocated for a user flow. Earliest Due Date scheduling algorithm is packet deadline driven. The rate assignment per user flow is not done explicitly but it is reflected in the service amount provided to the flow based on the delay criteria. Even though this idea may meet the delay requirements under normal operations, it does not cope with congestion (this may be common for the real time traffic with variable rate characteristics such as video conferencing and video streaming). In this scenario, packets with close deadlines will overbook the server, and given that there are no service rate control per user flow, the algorithm becomes unfair and packets will be dropped in an uncontrolled fashion.

Additionally, the known algorithms assume service of complete packets before scheduling another packet. This means that the transmission of a scheduled packet should be completed before scheduling another packet. Therefore the delay guarantees of a packet depends on the length of another packet (in a different flow) sharing the same channel. For example, a new short packet arriving in the system will be penalised by waiting for longer packets to finish transmission.

SUMMARY OF THE INVENTION

It is therefore an object of the present invention to provide a method and network node for controlling packet flow in data networks, by means of which network throughput can be optimized.

This object is achieved with a method of controlling a data packet flow in a buffer means of a network node of a data network, said method comprising the steps of: assigning a nominal capacity to each data flow; and shifting free free-capacity from a first flow portion to a second flow portion, when a new data packet of said second flow portion has been received at said buffer means and said nominal capacity has been exceeded.

Furthermore, the above object is achieved by a network node for controlling a data packet flow in a buffer means of said network node, wherein said network node comprises flow control means for assigning a nominal capacity to each data flow, and for shifting free capacity from a first flow portion to a second flow portion when a new data packet of said second flow portion has been received at said buffer means and said nominal capacity has been exceeded.

According to a first example, the nominal capacity may be an upper buffer memory limit of a buffer memory of said buffer means shared between a plurality of channels allocated to respective packet data connections and determined in dependence on the number of allocated channels, and memory space may be shifted from the first channel to a second channel, when a new data packet of the second channel has been received and not enough memory space is available for the second channel.

Accordingly, one channel is allowed to use extra memory after running out of its dynamically determined upper buffer memory limit (or quota), which helps to reduce packet-drops and thus improves the overall packet-throughput. Specifically, such a dynamic buffer sharing mechanism leads to an improved network throughput during congestions. Moreover, the traffic via the network device tends to be smoother and less bursty as a result of the dynamic buffer sharing which also leads to a higher buffer utilization.

According to an advantageous development, the upper buffer memory limit is determined by dividing the total buffer memory capacity by the number of allocated channels. Thereby, the upper buffer memory limit or quota of every channel is continuously adapted to the current number of allocated channels.

The second channel may be a new channel to be allocated or a channel having reached its upper buffer memory limit. In both cases, new memory space of the buffer memory can be allocated to the second channel.

According to another advantageous development, a channel with the longest packet queue may be selected as the first channel, and a predetermined data packet may be dropped from the queue of the first channel, when no free memory is available in the buffer memory. Thus, a packet of the longest queue is dropped to provide memory space for the new packet of the second channel. Hence, a push-out feature for fairness is provided with a longest-queue-drop mechanism. Preferably, the predetermined data packet to be dropped is located at the front of the queue of the first channel, to thereby provide an advantageous drop-from-front mechanism.

However, this dropping of the predetermined data packet may be inhibited and the new data packet may be dropped, if the queue of the second channel has already reached the upper buffer memory limit.

According to a further advantageous development, the channel with the longest packet queue may be determined by an estimation. Preferably, this estimation may be performed by storing the length and identity of the last determined longest queue, comparing the length of a current queue with the stored longest queue on a queuing event, and updating the length and identity of the stored longest queue according to the result of comparison. Such a longest-queue-drop policy counteracts an inherent unfairness obtained due to the tendency of connections to a round trip time (RTT) biasing.

The determination of the upper buffer memory limit and the selection of the channel with the longest packet queue may be performed in the buffer control means. In particular, the buffer control means may be arranged to inhibit the dropping of the predetermined packet and to control the allocating means to drop the new data packet, if the second channel has reached the upper buffer memory limit.

According to a second example, the nominal capacity may be a nominal flow rate at which data flow traffic is guaranteed. Then, the free capacity may be a residual rate corresponding to the difference between said nominal flow rate and an instantaneous traffic rate of said first flow portion.

Accordingly, packets with higher delay sensitivity can be allowed to be served on time from the buffer means, which results in a lower packet drop ratio, because more packets meet their deadlines and, hence, a higher system throughput and is suitable to support real time services. As long as the flow has traffic, it is guaranteed that the traffic on that flow can be transmitted at least at the nominal rate. Using this nominal rate model, a nominal rate is assigned per user flow. However, the model allows the service to be switched between different flows (even different packets) before reaching a service amount equal to the nominal rate. The overall service rate, however, for a given user would still meet the nominal rate. The residual rate can be "lent" to other flows to maximize total system throughput. Conversely, the current flow can "borrow" from the residual rates of other flows to smooth out peak rate demands which exceed its own nominal rate.

This nominal rate model leads to a far better control scheme that will provide fairness and guarantees the rate requirements for each flow because the nominal rate allocation is respected all the time. It is focussed on rate guarantees only. Therefore allowing the QoS scheduler to separate the delay allocation from the rate allocations, so no coupling may exist, and therefore improving resource utilization efficiency. The rate is controlled by the allocation of the nominal rate per user flow and by borrowing bandwidth from other flows in a controlled fashion. The delay can be controlled on a per-packet basis using a different model that integrates with the QoS scheduler.

Furthermore, arriving packets may be segmented into data segments and the packets may then be scheduled at the data segment level. This provides the capability for the QoS scheduler to switch service between packets. This way, packets with higher sensitivity do not have to wait until another packet transmission is complete if the packet being served can afford the extra delay. This leads to an increase in the system throughput.

A new data flow may be admitted only if the nominal flow rate of the new data flow falls within the remaining system bandwidth. The remaining system bandwidth is then decremented by said nominal flow rate if said new data flow is admitted.

The QoS scheduling algorithm may be adapted to operate on a per-round basis, wherein multiple users can be served at one round and/or a user data flow can be served with more than one data packet at one round. Each round may correspond to one or more WCDMA (Wideband Code Division Multiple Access) radio frames or one or more EDGE TDMA (Enhanced Data rate for GSM Evolution Time Division Multiple Access) frames. The first and second flow portions may belong to different data flows scheduled on the same round. Furthermore, the first and second flow portions may belong to the same data flow, wherein the first flow portion is scheduled on a round following the round of the second flow portion. Additionally, the first and second flow portions may belong to different data flows, wherein the first flow portion is scheduled on a round following the round of the second flow portion. Thus, in addition to inter-flow borrowing/lending, the model allows for intraflow borrowing/lending. That is, a given flow can borrow or lend from/to itself by deferring the transmission of some of the data to smooth out peak rate demands, provided the deferred data would still meet the real-time requirements.

The nominal rate can be used as a natural means of admission control. For example, the system may decide to admit a new flow only if the flow's nominal rate falls within the remaining bandwidth of the system. The remaining bandwidth is decremented by the nominal rate whenever a new flow is admitted.

Furthermore, an urgency factor may be assigned to each data packet, wherein the target flow for said shift of said free capacity is determined based on said urgency factor.

Alternatively, an accumulated residual bandwidth may be determined for each data flow, wherein the target flow for said shift of said free capacity is determined based on said accumulated residual bandwidth.

BRIEF DESCRIPTION OF THE DRAWINGS

In the following, the present invention will be described on the basis of preferred embodiments with reference to the accompanying drawings in which.

DESCRIPTION OF THE PREFERRED EMBODIMENTS

The preferred embodiments of the present invention will now be described on the basis of a PDCP layer queuing management and a MAC layer QoS scheduling function in a Radio Network Controller (RNC) 10 of a 3G network.

Figure 1:
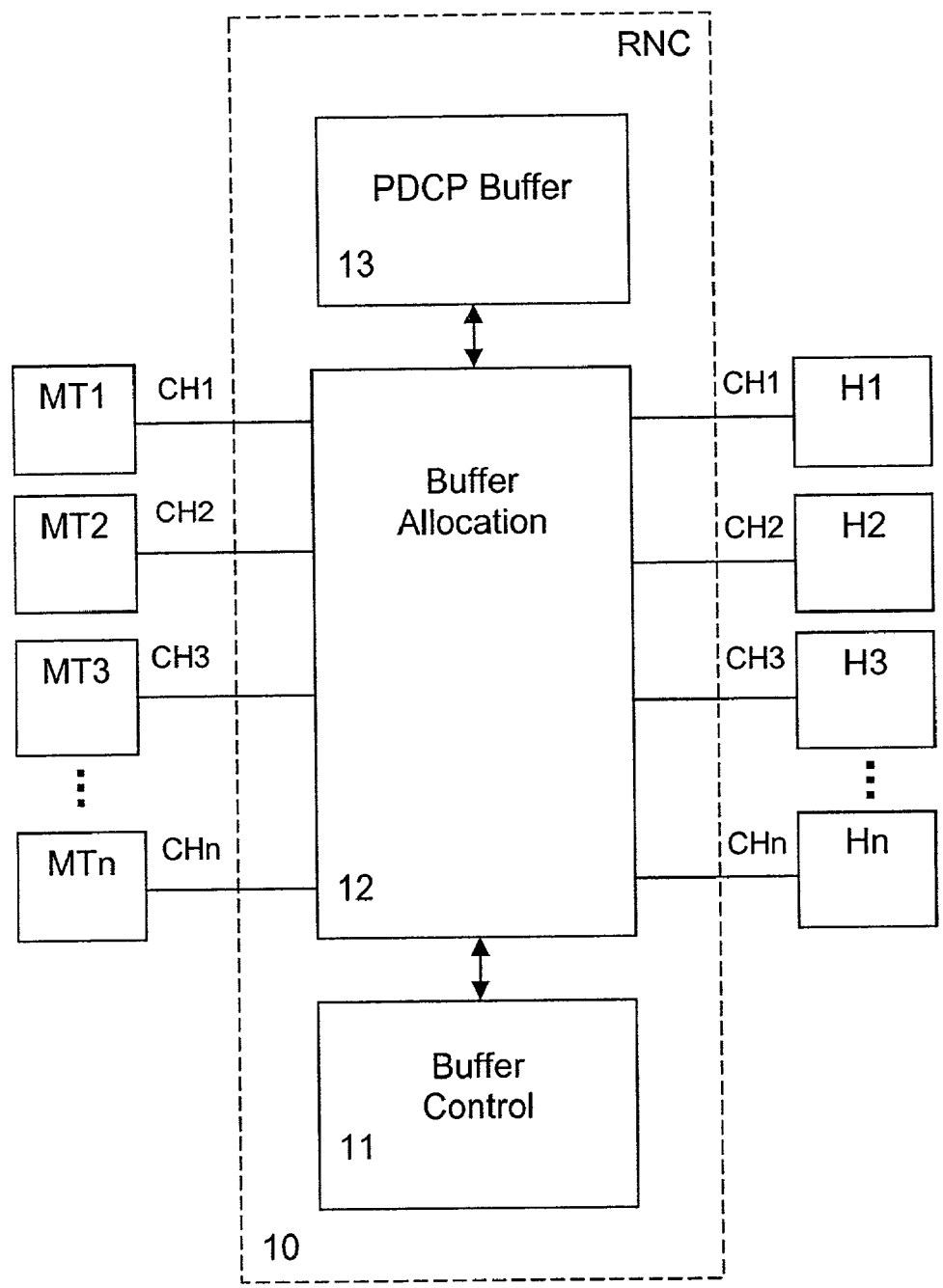
FIG. 1 shows a functional block diagram of PDCP layer functions of a radio network controller according to the first preferred embodiment.

In FIG. 1, a functional block diagram of those RNC PDCP layer functions relevant to the first preferred embodiment of the present invention are shown. In particular, a buffer allocation unit or functionality 12 is used for optimizing packet flow control by sharing or allocating memory space of a PDCP buffer 13 between/to respective channels CH1 to CHn which are allocated to prevailing or active connections between respective mobile terminals MT1 to MTn and corresponding Internet hosts H1 to Hn. In a special case, data may also be exchanged between mobile terminals, such that an Internet host may actually correspond to another mobile terminal. In each allocated or reserved one of the channels CH1 to CHn, data packets (e.g. PDCP PDUs) may be stored in respective buffer queues, i.e. one packet queue is provided for each channel. In each channel, the buffer utilization is counted in bytes.

Furthermore, a buffer control unit or functionality 11 is provided in the RNC 10 to control the buffer allocation of the buffer allocation functionality 12. In each channel, a downlink queue and an uplink queue are provided, wherein data packets routed from a mobile terminal to an Internet host may be stored in an uplink queue, and data packets routed from an Internet host to a mobile terminal may be stored in a downlink queue.

The buffer control functionality 11 dynamically calculates an upper buffer memory limit (quota) for each channel buffer according to the following equation:

quota=total buffer size/current number of active queues

Thus, the upper buffer memory limit or maximum queue size allocated to each channel is continuously adapted to the number of active queues provided for the active connections. For example, if the total buffer size is 2 MB and the number of currently provided active queues is 40, then the average quota or upper buffer memory limit for each channel buffer is 2 MB/40=50 KB. Thus, a maximum capacity of 50 KB is allowed for each channel buffer in this situation. However, this quota can be surpassed by individual channels, as long as free memory capacity or space is provided in the PDCP buffer 13, e.g. since not all queues are filled.

Thus, extra use of buffer is permitted for each channel, while the above mentioned channel quota is guaranteed for each channel.

To achieve the provision of the guaranteed channel quota, push-out operations, i.e. dropping of data packets from the queues, are initiated for reasons of fairness between the active queues. When such a push-out is initiated, later described longest-queue-drop and drop-from-front mechanisms may be initiated. Moreover, one channel may use extra buffer memory after running out of its quota, which helps to reduce packet drops and thus improve the packet throughput. The corresponding control of buffer allocation is performed by the buffer control functionality 11.

The buffer allocation functionality 12 may be implemented as an address generating mechanism used for addressing the PDCP buffer 13. The queue buffers may be arranged with a shift register mechanism which may be implemented by an address counter with a re-circulating endless address counting function, such that a FIFO (First-In-First-Out) functionality is achieved. As an alternative, the buffer allocation functionality 12 may be implemented as a combined switching and addressing function arranged to provide a desired allocation of memory space to the individual channels CH1 to CHn.

The buffer control functionality 11 may be implemented by a processor unit controlled by a predetermined control program. The PDCP buffer 13 may be any random access memory or other re-writable type of memory.

Figure 2:
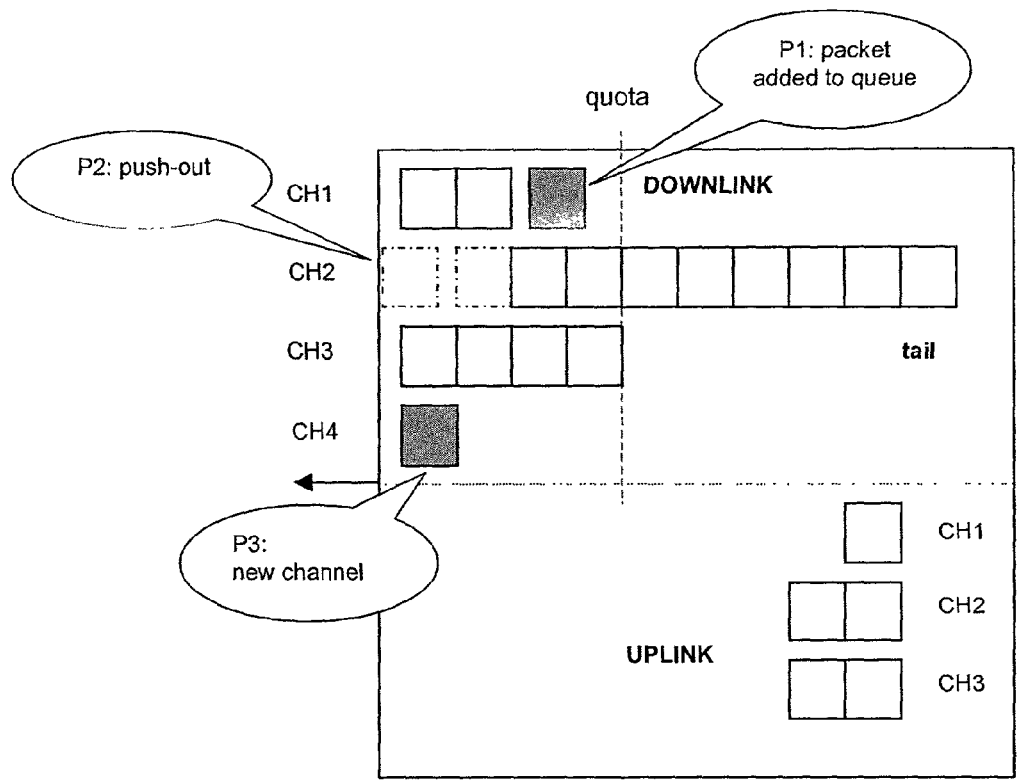
FIG. 2 shows a schematic diagram of a buffer control at different queuing events.

FIG. 2 shows a schematic diagram indicating different queuing events which may be dealt with during the buffer memory allocation. According to FIG. 2, three downlink buffer queues and three uplink buffer queues with different queue lengths are active. In the downlink direction, the right end of the queues corresponds to their tale. As can be gathered from FIG. 2, the buffer utilization is higher in the downlink direction, which may be due to the fact that a certain degree of asymmetry is usually generated due to the downloading operations from the internet. In the present present case, an active queue allocated to a second channel CH2 is the longest one. Assuming a case that no additional free memory is available in the PDCP buffer 13 and a new packet P1 is to be added to the queue of the first channel CH1, which has not reached its quota, a push-out operation is performed at the queue of the second channel CH2, since this channel has already reached and surpassed its quota and has the longest packet queue. Preferably, a packet P2 located at the front of the queue is pushed out.

If a new packet of a new connection is received by the RNC 10, a new, fourth channel CH4 is opened for or allocated to the connection, and memory space of the PDCP buffer 13 is allocated by the buffer allocation functionality 12 to the fourth channel. If no free memory space is available in the PDCP buffer 13, a push-out operation is again initiated, wherein the current data packet located at the front of the queue of the second channel CH2 is dropped to provide memory space for the buffer of the new fourth channel CH4.

Thus, push-out operations can happen in the following two cases. If a new channel is set up and there is no free buffer memory, a push-out action occurs, in which another channel drops one or more packets so that the new channel has enough memory space allocated for the first data packet. Additionally, if an existing channel asks for more buffer memory and no free memory is available in the PDCP buffer 13, a push-out happens for another channel. However, if the existing channel has already reached its quota or the incoming packet size is larger than the remaining bytes in the quota of the existing channel, the push-out operation is refused or inhibited by the buffer control functionality 11. In this case, the new data packet is dropped.

In particular, a longest-queue-drop policy may be implemented by the buffer control functionality 11. This means that the buffer allocation functionality 12 is controlled by the buffer control functionality 11 to drop a predetermined data packet from the longest queue, when a push-out operation is initiated. The advantage of this longest-queue-drop policy is described based on heuristic arguments in B. Suter et. al., "Efficient Active Queue Management for Internet Routers".

In the RNC 10, a channel can be roughly regarded as a number of flows. Despite the above mentioned fair queuing, the throughput of TCP connections depends heavily on their respective round trip times (RTT), because an increase in the transmission window of TCP (Transmit Control Protocol) increases per RTT such that connections with shorter RTTs increase their windows faster. Connections achieve full throughput only when their transmission window equals or exceeds their available bandwidth-delay product and so start forming a standing queue, which grows by one packet per RTT, somewhere in the network. This queue again grows faster for connections with shorter RTTs. However, dropping from the longest queue counteracts this inherent unfairness resulting from RTT-biasing. Furthermore, high-rate, unresponsive flows are likely to have the longest queues during congestion. Dropping from the longest queue is an incentive to be adaptive, particularly for high bandwidth applications where it matters most. In general, the flow with the longest queue is most likely to have used its full potential during the queue buildup and before the onset of congestion.

The determination of the longest queue in the buffer control functionality 11 may be based on an estimation, as an implementation of strict longest queue drop requires either expansive searching or sorting operations for accessing the longest queue at any time.

The estimation may be performed by storing the length and identity of the last reported or determined longest queue e.g. in a register. On every queuing event (i.e. queuing, dequeuing and dropping), the length of the current queue is compared with the length of the registered queue. Based on this comparison, the stored length and identity of the longest queue is adjusted or updated, if the current queue is longer. This approximation ensures optimal estimation, except when scheduling weights vary over a very wide range.

Furthermore, as suggested in T. V. Lakshman et. al., "The Drop from Front Strategy in TCP over ATM and its Interworking with other Control Features", Proc. INFOCOM '96, pp. 1242–1250, the drop-from-front queuing enhances the TCP performance. It improves the throughput by reducing the duration of congestion episodes, since the packet loss indicating congestion reaches the sender earlier by the service time of the full queue. For UDP (User Datagram Protocol) traffic which has flow-control in its application level, drop-from-front may also lead to an early information of the endpoints.

Thus, the predetermined data packet to be dropped in the push-out operation is preferably located at the front of the respective buffer queue.

Figure 3:
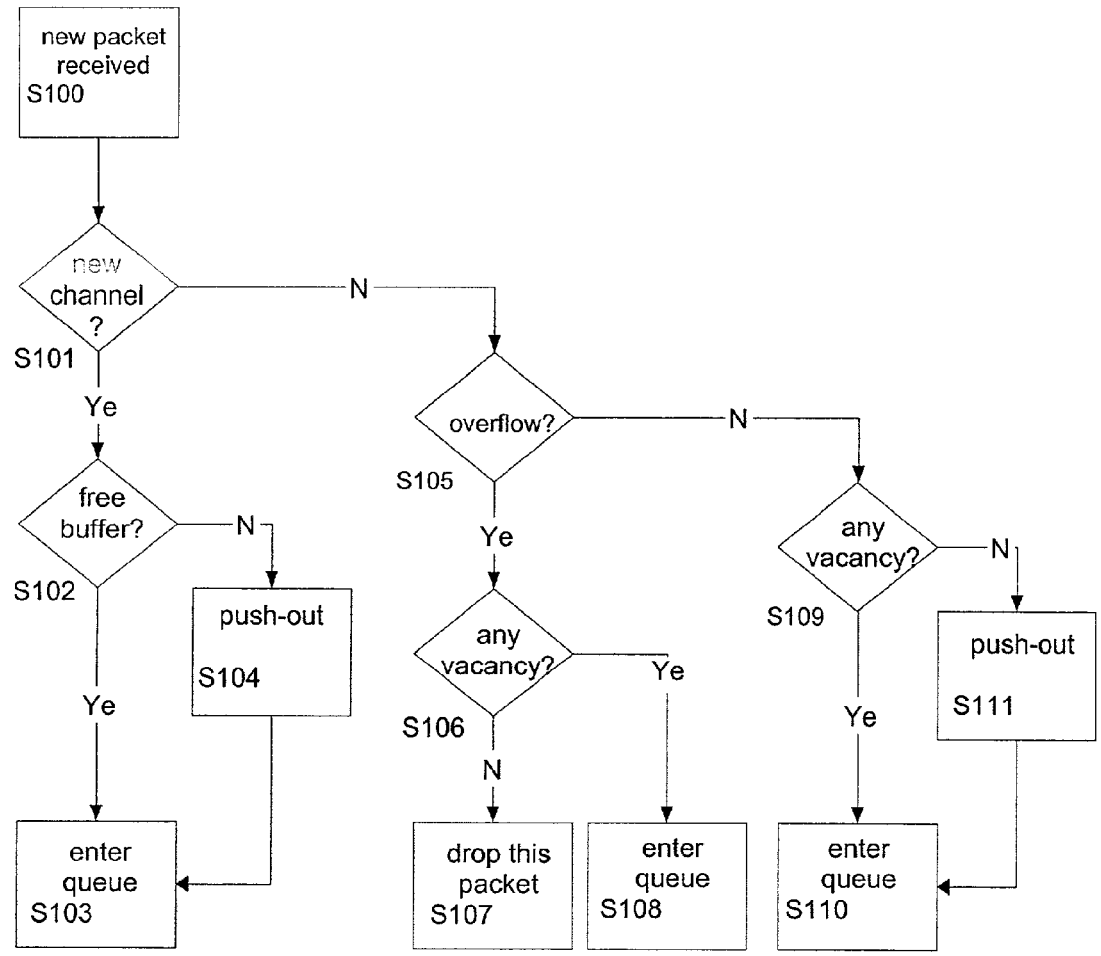
FIG. 3 shows a flow diagram of a packet control method according to the first preferred embodiment.

FIG. 3 shows a schematic flow diagram of the queuing management or control method according to the preferred embodiment.

When a new packet is received in step S100, the buffer control functionality 11 checks in step S101 whether a channel has already been allocated to the corresponding connection or whether a new channel has to be opened. If a new channel is required, the buffer control functionality 11 checks whether any free memory space is available in the PDCP buffer 13 (step S102). If the required amount of buffer space is available, the buffer control functionality 11 controls the buffer allocation functionality 12 to allocate memory space to the new channel and to enter the received data packet into the respective buffer queue (step S103). If it is determined in step S102 that no free buffer is available in the PDCP buffer 13, the buffer control functionality 11 initiates a push-out operation by controlling the buffer allocation functionality 12 to drop the foremost data packet of the longest queue indicated in the respective register storing the information of the estimated or calculated longest queue (step S104). Then, the received new data packet can be entered into the queue generated by the freed memory space.

If it is determined in step S101 that a channel has been already allocated to the connection of the received new packet, a check is performed in step S105 as to whether the buffer queue of the corresponding channel has already reached the upper buffer memory limit (quota). If so, it is checked whether any memory space is vacant or available in the other channels (step S106). If not, the received new packet is dropped in step S107. If a memory vacancy is determined in step S106, the received new packet is entered to the buffer queue of its channel, while the memory space is shifted from the buffer memory allocated to the other channel with the detected vacancy (step S108).

If it is determined in step S105 that the buffer memory of the concerned channel has not yet reached the upper buffer memory limit (quota) and will not overflow when the received new packet is entered into the queue, it is checked in step S109 whether memory space is available in the PDCP buffer 13. If so, the received new data packet is entered into the buffer queue of the corresponding channel (step S110). If no memory space is available in the PDCP buffer 13, a push-out operation as defined in step S104 is initiated by the buffer control functionality 11 in step S111. Then, the generated new memory space is allocated to the concerned channel of the received new data packet which is then entered into its buffer queue (step S110).

Thus, a push-out operation is performed in an active channel if a new channel is to be allocated to a new connection and no memory space is available in the PDCP buffer 13, or if a new data packet is to be added to the buffer queue of an existing channel which has not yet reached its quota and will not reach its quota when the new data packet is entered.

The above described dynamic buffer sharing mechanism according to the preferred embodiment leads to a reduced number of dropped packet in the PDCP buffer 13 during congestion and therefore improves the network throughput. Furthermore, the traffic via the RNC 10 tends to be smoother and less bursty and the buffer utilization is higher.

Figure 4:
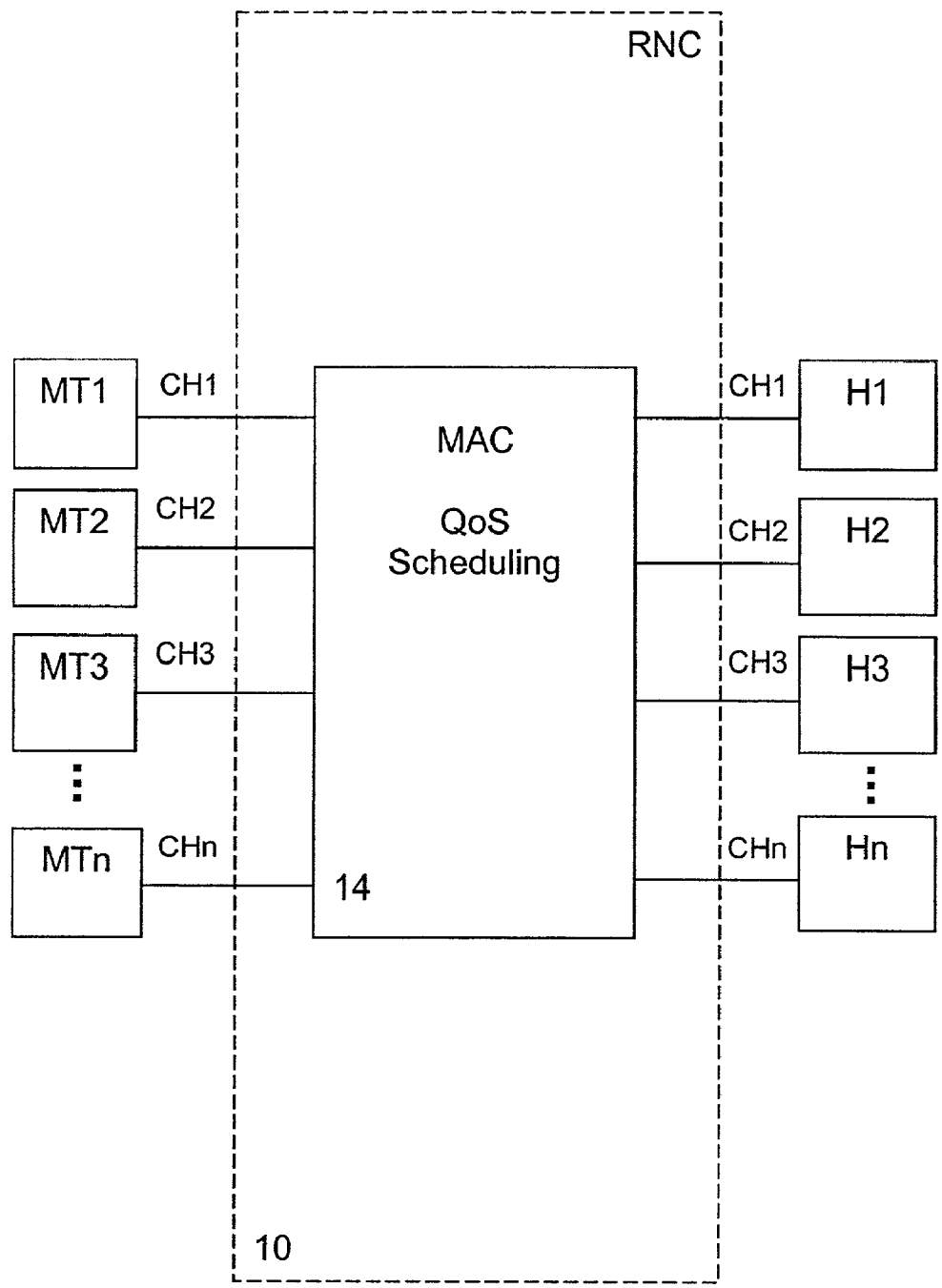
FIG. 4 shows a functional block diagram of a QoS scheduling function of a radio network controller according to the second preferred embodiment.

In FIG. 4, a functional block diagram of those RNC MAC layer functions relevant to the second preferred embodiment of the present invention are shown. In particular, a QoS scheduling function 14 of the RNC 10 is used for optimizing packet flow control. The remaining parts of FIG. 4 are similar to those shown in FIG. 1, and a description thereof is therefore omitted. The scheduling function 14 is adapted to manage the forwarding of different packet streams or flows using a set of queues of a buffer arrangement (not shown) provided in said scheduling function 14. Furthermore, a packet scheduler is implemented in said scheduling function 14 at a point where the packets are queued in the buffer arrangement.

It is assumed that an IP packet transmitted between respective ones of the mobile terminals MT1 to MTn and the Internet hosts H1 to Hn is split into data segments for the purpose of transmission. In packet cellular systems, the data segments correspond to RLC/MAC blocks. Each data segment is transmitted individually over the transmission media when a transmission opportunity is granted. In this context, we define a transmission opportunity as any method used to transport a data segment on the physical transmission media supported; for e.g. in TDMA systems, the transmission opportunity is a time slot and in WCDMA systems it is the utilization of a unique Walsh code in a Radio Frame. The Radio Frame is shared by multiple users using different Walsh codes.

The algorithm used in the QoS scheduling function 14 schedules the IP packets and organises the transmission opportunity reservation process for concurrent user traffic. In a wireless link, the QoS scheduler would schedule concurrent user traffic flows waiting in the buffer arrangement for service on the uplink and/or the downlink. The main challenge in this task is to allow all user flows to be served from the buffer arrangement in a fair and optimum fashion that will meet the traffic constraints and maximise the system throughput.

According to the second preferred embodiment, a Nominal Rate model is applied as an integral part of the QoS scheduling algorithm to guarantee the rate requirements for real-time services. Given the real time nature and Variable Bit Rate characteristics of the traffic (e.g. real time video and streaming video), the nominal rate model provides rate guarantees to user flows and allows fair allocation of residual bandwidth that occur in user flows. It is noted that the QoS scheduling algorithm may integrate the nominal rate model with other algorithms and features that are not mentioned herein.

Figure 5:
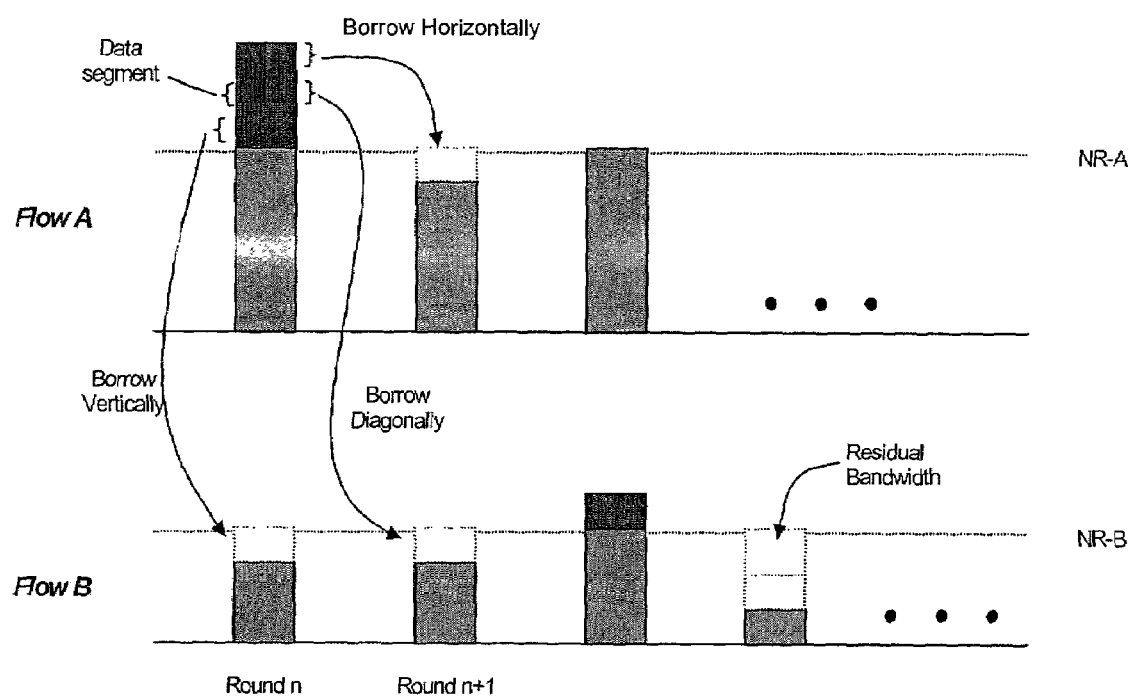
FIG. 5 shows a diagram indicating a concept of nominal rate and residual rate allocation according to the second preferred embodiment.

FIG. 5 shows a time-dependent diagram of two independent real time user flows A and B that may have different QoS profiles, and could belong to the same or different users. A flow refers to a stream of IP packets (segmented into data segments) for a given user running a specific session in a given application. Nominal Rate (NR) values NR-A and NR-B are assigned as nominal capacities to the flows A and B, respectively after initial access. It is assumed that the total assigned nominal rates do not exceed the maximum capacity of the RNG 10. The value of NR for a given user flow is related to the QoS profile. An example could be a factor of the contracted rate for that flow, calculated based on the following equation:

$$NR_i = \alpha \times CR_i$$

where $\alpha$ is fractional value to be determined. The value of $\alpha$ will define a tradeoff between the overall packet loss ratio and system throughput. Furthermore, $\alpha$ can also serve as a safety factor to absorb some of the fluctuations in the service rate on the transmission link. $NR_i$ represents the nominal rate assigned to a given user flow i, and $CR_i$ represents the contracted rate for that flow i.

The term "Round" in FIG. 5 indicates one QoS scheduling round during which multiple data segments can be scheduled. A residual bandwidth indicated in the user flow B in the Round n+3 corresponds to the number of data segments remaining up to the nominal rate NR-B after all available data segments have been served. At each round, multiple users can be served, and depending on the round length, a user flow can be served more than one data segment or even IP packets. An example of the scheduler round can be one or more Radio Frames in WCDMA or TDMA frames (8 time slots each) in EDGE.

During each scheduler round, a user flow in a queue of said buffer arrangement is allowed service up to its nominal rate. Given the VBR and real time nature, a user flow instantaneous arrival rate may exceed its nominal rate leading to backlogged packets (or data segments). That user flow will require more than its assigned nominal rate to complete service. In another scenario, the arrival rate may be lower than the nominal rate therefore creating residual bandwidth in the flow. The idea behind rate guarantees is to provide a minimum service rate to a user flow independently from the behavior of other flows. The nominal rate model achieves this objective using the nominal rate value. Another factor to be considered may be a delay guarantee for a given packet. This can be handled by another algorithm which is an integral part of the QoS scheduling function 14.

Packets in a user flow exceeding the nominal rate value can be tagged. In order to achieve maximum resource utilization efficiency, a concept of bandwidth or capacity borrowing is introduced. Due to the rate fluctuations in the user flows, residual bandwidth or capacity may occur in a flow at different scheduling rounds. The idea is to allow a user flow to borrow or shift bandwidth or capacity on top of its allocated nominal rate when needed, and share its allocated bandwidth or capacity with other user flows or queues when it contains some residual bandwidth. A flow can borrow bandwidth in three fashions: horizontally, vertically and diagonally as indicated in FIG. 5. Horizontal borrowing uses residual bandwidth from the same user flow or queue but in future upcoming scheduling rounds. This would be done if the flow in need of extra bandwidth can afford the waiting delay without exceeding the QoS delay requirements on an IP packet basis. Vertical borrowing uses residual bandwidth from another flow or queue scheduled on the same round. Diagonal borrowing uses residual bandwidth from another flow or queue scheduled on a future scheduling rounds. Again, this is done if the packets exceeding nominal rate in the flow can afford the waiting delay without exceeding the QoS delay requirements. If the latter are exceeded, the packets are simply dropped.

In cases where multiple flows exceed their nominal rate, it is important to provide a fair residual bandwidth allocation. One of the criteria that can be used to schedule packets exceeding nominal rate is a service urgency factor that can be assigned to each packet. This factor may take into consideration the packet length, its delay requirements and/or other constraints. The packet with the highest urgency is selected first, and the next data segment from that packet is sent on the transmission link.

Another criteria that can be used to schedule packets exceeding the nominal rate is the accumulated residual bandwidth per flow. In this case, the flow with maximum accumulated residual bandwidth is given priority. This idea allows each user flow to have an overall service rate closest to its nominal rate, therefore providing fairness in service between all flows and meeting the QoS rate requirements.

The nominal rate model according to the second preferred embodiment simplifies the QoS scheduling algorithm and reduces its complexity level. With minor parameter changes, the nominal rate model can be radio technology independent (EDGE, WCDMA, etc.).

It is to be noted that the invention can be implemented in any network node where a control of packet flows based on queuing management, scheduling and/or other flow control schemes is required in a buffer arrangement with different flow parameter guarantees for different traffic flows (e.g. VBR). Scheduling of one packet at a time (packet service should be completed before serving another one) is a special case of the nominal rate model. Although service of IP packets was assumed in the preferred embodiments, the invention can be applied in any packet data service with QoS rate requirements. The nominal rate model may also be used in scheduling of non-real time traffic to provide a fair allocation of the shared transmission media and achieve fairness and peek resource utilization efficiency. Furthermore, the present invention can be implemented in any buffer arrangement of any network node, where a total buffer memory space is allocated to a plurality of buffer queues. In particular, the present invention is not restricted to the described longest-queue-drop and drop-from-front mechanisms. Any other suitable dropping rule can be adopted. Thus, the preferred embodiments may vary within the scope of the attached claims.

The invention claimed is:

1. A method of controlling a data packet flow in a buffer means of a network node of a data network, said method comprising the steps of:
   (a) assigning a nominal capacity to each data flow; and
   (b) shifting free capacity from a first flow portion to a second flow portion, when a new data packet of said second flow portion has been received at said buffer means and said nominal capacity has been exceeded;
   wherein said nominal capacity is an upper buffer memory limit of a buffer memory of said buffer means shared between a plurality of channels allocated to respective packet data connections and determined in dependence on the number of allocated channels, and wherein memory space is shifted from said first channel to a second channel, when a new data packet of said second channel has been received and not enough memory space is available for said second channel,
   wherein a channel with the longest packet queue is selected as said first channel, and a predetermined data packet is dropped from the queue of said first channel, when no free memory is available in said buffer memory,
   wherein said dropping of said predetermined data packet is inhibited and said new data packet is dropped, if the queue of said second channel has reached said upper buffer memory limit,
   wherein said channel with the longest packet queue is determined by an estimation, and
   wherein said estimation is performed by storing the length and identity of the last determined longest queue, comparing the length of a current queue with said stored longest queue on a queuing event, and updating the length and identity of said stored longest queue according to the result of comparison.

2. A method according to claim 1, wherein said upper buffer memory limit is determined by dividing the total buffer memory capacity by the number of allocated channels.

3. A method according to claim 2, wherein said second channel is a new channel set up for a new packet data connection.

4. A method according to claim 2, wherein said second channel is a channel having reached its upper buffer memory limit.

5. A method according to claim 1, wherein said second channel is a new channel set up for a new packet data connection.

6. A method according to claim 1, wherein said second channel is a channel having reached its upper buffer memory limit.

7. A method according to claim 1, wherein said predetermined data packet is located at the front of the queue of said first channel.

8. A method according to claim 1, wherein said buffer means is a Packet Data Convergence Protocol (PDCP) buffer.

9. A method according to claim 8, wherein said packet data connections are connections between mobile terminals (MT I-MTn) and Internet hosts (HiHn), or between mobile terminals.

10. A method according to claim 1, wherein said nominal capacity is a nominal flow rate at which data flow traffic is guaranteed.

11. A method according to claim 10, wherein said free capacity is a residual rate corresponding to the difference between said nominal flow rate and an instantaneous traffic rate of said first flow portion.

12. A method according to claim 11, further comprising the step of admitting a new data flow only if the nominal flow rate of said new data flow falls within the remaining system bandwidth.

13. A method of controlling a data packet flow in a buffer means of a network node of a data network, said method comprising the steps of:
assigning a nominal capacity to each data flow;
shifting free capacity from a first flow portion to a second flow portion, when a new data packet of said second flow portion has been received at said buffer means and said nominal capacity has been exceeded; and
admitting a new data flow only if the nominal flow rate of said new data flow falls within the remaining system bandwidth,
wherein said nominal capacity is a nominal flow rate at which data flow traffic is guaranteed,
wherein said free capacity is a residual rate corresponding to the difference between said nominal flow rate and an instantaneous traffic rate of said first flow portion, and
wherein said remaining system bandwidth is decremented by said nominal flow rate if said new data flow is admitted.

14. A method according to claim 13, wherein said method is used in a QoS scheduling algorithm for scheduling concurrent user traffic.

15. A method according to claim 14, wherein said QoS scheduling algorithm is adapted to operate on a round basis, and wherein multiple users can be served at one round and/or a user data flow can be served with more than one data packet at one round.

16. A method according to claim 15, wherein said round corresponds to one or more WCDMA radio frames or one or more EDGE TDMA frames.

17. A method according to claim 16, wherein said first and second flow portions belong to different data flows scheduled on the same round.

18. A method according to claim 16, wherein said first and second portions belong to the same data flow, and said first flow portion is scheduled on a round following the round of said second flow portion.

19. A method according to claim 16, wherein said first and second flow portions belong to different data flows, and said first flow portion is scheduled on a round following the round of said second flow portion.

20. A method according to claim 15, wherein said first and second flow portions belong to different data flows scheduled on the same round.

21. A method according to claim 15, wherein said first and second portions belong to the same data flow, and said first flow portion is scheduled on a round following the round of said second flow portion.

22. A method according to claim 15, wherein said first and second flow portions belong to different data flows, and said first flow portion is scheduled on a round following the round of said second flow portion.

23. A method according to claim 22, wherein said nominal flow rate is determined based on the following equation:

$$NR_i = \alpha \times Cr_i$$

wherein $\alpha$ denotes a fractional value defining a tradeoff between an overall packet loss ratio and a system throughout, $NR_i$ denotes a nominal flow rate assigned to a concerned user data flow i, and $Cr_i$ denotes a contracted data rate for said concerned user data flow i.

24. A method according to claim 23, wherein an urgency factor is assigned to each data packet, and the target flow for said shift of said free capacity is determined based on said urgency factor.

25. A method according to claim 23, wherein an accumulated residual bandwidth is determined for each data flow, and the target flow for said shift of said free capacity is determined based on said accumulated residual bandwidth.

26. A method according to claim 25, wherein arriving data packets are segmented into data segments and scheduling is performed at the data segment level.

27. A network node for controlling a data packet flow in a buffer means of said network node, wherein said network node comprises flow control means for assigning a nominal capacity to each data flow, and for shifting free capacity from a first flow portion to a second flow portion when a new data packet of said second flow portion has been received at said buffer means and said nominal capacity has been exceeded, wherein said buffer means comprises a buffer memory shared between a plurality of channels allocated to respective packet data connections, and said flow control means comprises buffer control means for determining an upper buffer memory limit for each channel in dependence on the number of allocated racket data connections and for controlling allocating means so as to shift memory space allocated to a first channel from said first channel to a second channel, when a new data packet of said second channel has been received and not enough memory space is available for said second channel, wherein said buffer control means is arranged to select a channel with the longest packet queue as said first channel and to control said allocating means so as to drop a predetermined data packet from the queue of said first channel when no free memory is available in said buffer memory, and wherein said buffer control means is arranged to estimate said channel with the longest packet queue by storing the length and identity of the last determined longest queue, to compare the length of a current queue with said stored longest queue on a queuing event, and to update the length and identity of said stored longest queue according to the result of comparison.

28. A network node according to claim 27, wherein said buffer control means is arranged to determine said upper memory limit by dividing the total buffer memory capacity by the number of allocated channels.

29. A network node according to claim 28, wherein said buffer control means is arranged to inhibit said dropping of said predetermined packet and to control said allocating means to drop said new data packet, if the queue of said second channel has reached said upper buffer memory limit.

30. A network node according to claim 27, wherein said buffer control means is arranged to inhibit said dropping of said predetermined packet and to control said allocating means to drop said new data packet, if the queue of said second channel has reached said upper buffer memory limit.

31. A network node according to claim 30, wherein said buffer memory is a Packet Data Convergence Protocol (PDCP) buffer.

32. A network node according to claim 27, wherein said flow control means comprises scheduling means and said nominal capacity is a nominal flow rate at which data flow traffic is guaranteed in a QoS scheduling algorithm.

33. A network node according to claim 32, wherein said scheduling means comprises said buffer means.

34. A network node according to claim 33, wherein said network node is a radio network controller.

* * * * *